United States Patent
Birman et al.

(10) Patent No.: US 7,671,859 B2
(45) Date of Patent: Mar. 2, 2010

(54) THIN INSTRUMENT CLUSTER WITH ANTI-REFLECTIVE COATING

(75) Inventors: Vyacheslav B. Birman, Rochester Hills, MI (US); Werner Eckardt, Rochester, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 210 days.

(21) Appl. No.: 11/434,651

(22) Filed: May 16, 2006

(65) Prior Publication Data
US 2006/0202993 A1 Sep. 14, 2006

Related U.S. Application Data

(63) Continuation-in-part of application No. 10/288,756, filed on Nov. 6, 2002.

(60) Provisional application No. 60/692,191, filed on Jun. 20, 2005.

(51) Int. Cl.
*G06T 15/50* (2006.01)
*G08B 5/00* (2006.01)

(52) U.S. Cl. .................. 345/426; 340/815

(58) Field of Classification Search ......... 362/600–627, 362/812, 554; 345/426; 349/137, 62, 63, 349/65
See application file for complete search history.

(56) References Cited

U.S. PATENT DOCUMENTS

| | | | |
|---|---|---|---|
| 3,752,974 A | | 8/1973 | Baker et al. |
| 5,128,659 A | * | 7/1992 | Roberts et al. .................. 345/7 |
| 5,975,711 A | * | 11/1999 | Parker et al. .................. 362/24 |
| 6,474,827 B2 | * | 11/2002 | Shinohara et al. ............ 362/607 |
| 6,796,668 B2 | * | 9/2004 | Parker et al. .................. 362/27 |
| 6,951,400 B2 | * | 10/2005 | Chisholm et al. ............. 362/29 |
| 7,090,389 B2 | * | 8/2006 | Parker et al. ............... 362/627 |
| 7,217,024 B2 | * | 5/2007 | Good et al. ................. 362/604 |
| 7,226,196 B2 | * | 6/2007 | Parker et al. ............... 362/606 |
| 2003/0090886 A1 | | 5/2003 | Eckardt et al. |
| 2006/0202993 A1 | * | 9/2006 | Birman et al. ............... 345/426 |

FOREIGN PATENT DOCUMENTS

| | | |
|---|---|---|
| EP | 0732679 | 9/1996 |
| EP | 1365262 | 11/2003 |

OTHER PUBLICATIONS

Search Report Dated Nov. 2, 2006.

* cited by examiner

*Primary Examiner*—Anabel M Ton

(57) ABSTRACT

An instrument display includes a light source that selectively emits light and a light guide that receives the light. One or more optical coating layers are disposed on the light guide. The light guide has a first index of refraction, and the optical coating layer or layers have a second index of refraction that is greater than the first index of refraction of the light guide. The optical coating layer or layers reduce glare from ambient light and increase the light transmitting performance of the light guide.

24 Claims, 3 Drawing Sheets

THIN INSTRUMENT CLUSTER WITH ANTI-REFLECTIVE COATING

CROSS REFERENCE TO RELATED APPLICATIONS

This application is a continuation in part of U.S. patent application Ser. No. 10/288,756, filed Nov. 6, 2002, and claims priority to U.S. Provisional Application No. 60/692,191, filed Jun. 20, 2005.

BACKGROUND OF THE INVENTION

This invention relates to vehicle instrument displays.

Instrument clusters for vehicles are typically located on a vehicle dashboard and may include a speedometer, tachometer, engine condition indicator, ABS braking indicator, and other devices for monitoring vehicle operating conditions. The instrument cluster includes display marks that may have lighting to illuminate each mark. For example, the ABS braking mark may be illuminated when the vehicle is undergoing ABS braking. Typically, such lighting is provided by individual lamps that illuminate each indicator of the dashboard. However, individual lamps take up significant space and require a high voltage circuit to supply current to each of the lamps. The high voltage further requires insulation to protect against shock, thereby increasing the cost and size of the instrument cluster.

Recently, it has become more common to use optical light guides to direct illumination to each of the display marks of the instrument cluster. However, each mark requires its own light guide and light source so that each individual mark may be separately illuminated. A typical instrument cluster has many separate indicators that require such lighting. Each light guide associated with each indicator is painstakingly assembled into the cluster one at a time. Consequently, a great deal of time and effort is required to individually piece the light guides into the instrument cluster.

In addition, existing light guides for an instrument display such as a dial require the use of a dial appliqué. The dial appliqué is a film of plastic having instrument display marks, such as the hash marks of a speedometer gauge, the numbers for the gauge, vehicle telltales, and other marks. Most of the dial appliqué is opaque except for the illuminated portions. A light guide used with the dial appliqué, such as the light guide for the speedometer gauge, may illuminate large portions of the dial appliqué rather than just the marks. Accordingly, existing instrument displays waste lighting energy.

A need therefore exists for a thin instrument cluster that avoids the complexity, inefficiency, and size of existing lighting systems.

SUMMARY OF THE INVENTION

An example instrument display includes a light source that selectively emits light and a light guide that receives the light. One or more optical coating layers are disposed on the light guide. The light guide has a first index of refraction, and the optical coating layer or layers have a second index of refraction that is greater than the first index of refraction of the light guide. The optical coating layer or layers reduce glare from ambient light and increase the light transmitting performance of the light guide.

An example method includes depositing one or more optical coating layers on a light guide. The light guide has a first index of refraction and the optical coating layer or layers have a second index of refraction that is greater than the first index of refraction of the light guide.

Another example instrument display includes a light source that selectively emits light and a light guide that receives the light. A plurality of opaque optical coating layers are disposed on the light guide to prevent light loss. For example, the opaque optical coating layers include a white paint, a black paint, and a gray paint.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
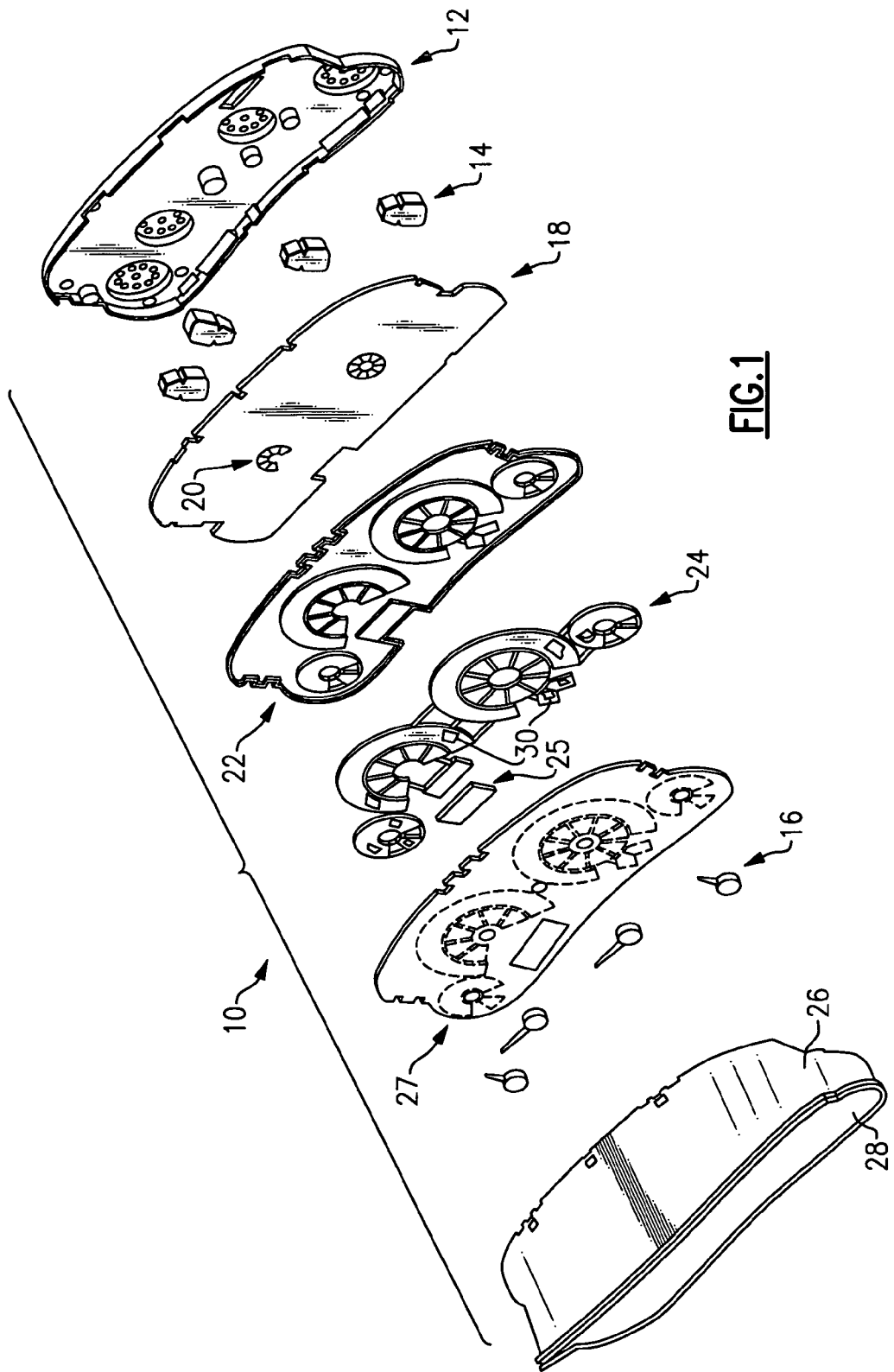
FIG. 1 is an exploded view of an example instrument display.

FIG. 1 illustrates an exploded view of an example instrument display 10, such as an instrument cluster for a motor vehicle. A back cover 12 provides support for movements 14 associated with pointers 16. A control unit 18, here a printed circuit board, has clusters of light emitting diodes 20, which are controlled by the control unit 18 to respond to various vehicle conditions in a known manner. Light emitting diodes 20 protrude through light housing 22 and provide light to light guides 24. Light from light emitting diodes 20 illuminates light guides 24.

A liquid crystal display 25 may also be associated with the instrument display 10 and be illuminated by one of the light guides 24. A dial appliqué 27 may be used in cooperation with the light guides 24 to provide desired graphics. A mask 26 and front lens 28 are secured to the back cover 12 in a known manner and protect the instrument display 10 from dust and debris for example.

In the illustrated example, the light guides 24 each have one or more instrument display marks 30, such as fuel level indicator, engine light indicator, or other known vehicle display marks. Each light guide 24 may be individually illuminated so that the desired instrument display marks 30 are illuminated upon the appropriate vehicle condition.

Figure 2:
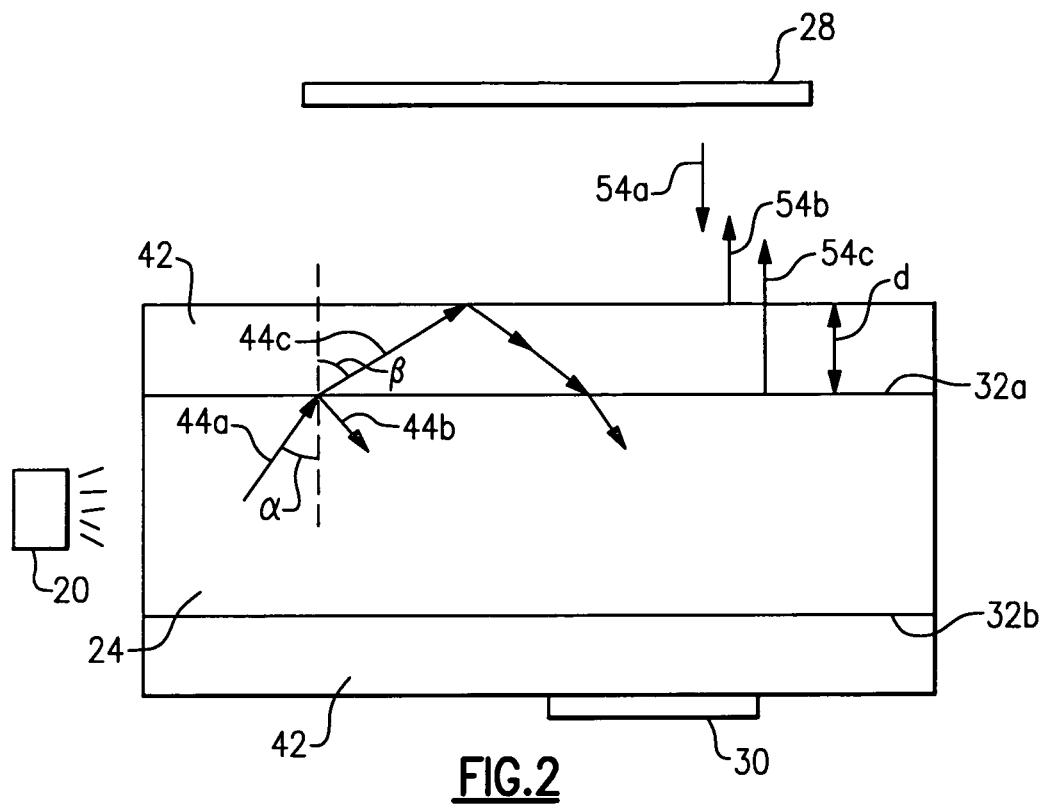
FIG. 2 is a schematic view of an example portion of a light guide and optical coating layer within the instrument display.

FIG. 2 shows a simplified schematic cross-sectional view of a portion of one of the light guides 24 that receives light from one of the light emitting diodes 20 to illuminate one of the instrument display marks 30. The light is transmitted through the light guide 24, which is made of known transparent or translucent material having an index of refraction. As is known, the index of refraction refers to a ratio of the speed of light in a vacuum to the speed of light in a substance.

The light guide 24 includes a front surface 32a that faces in a direction toward the front lens 28 and a rear surface 32b that faces in a direction away from the front lens 28. In this example, an optical coating layer 42 (i.e., an anti-reflective coating) is disposed on the front surface 32a and the rear surface 32b. For example, the optical coating layer 42 is painted or vapor deposited onto the light guide 24 in a known manner. The optical coating layer 42 is made of a known optical coating material that is transparent or translucent and has an index of refraction that is greater than the index of refraction of the light guide 24. In one example, the light guide 24 is made of a known plastic material, such as acrylic or polycarbonate, having an index of refraction between about 1.5 and 1.6. In the illustrated example, the instrument display mark 30 is on the rear surface 32*b*. The optical coating layer 42 provides a dual function of reducing ambient light reflection and reducing light loss of the light guide 24, as will be described below. Alternatively, the optical coating layer 42 is disposed on only one of the front surface 32*a* or the rear surface 32*b*.

In the illustrated example, light 44*a* emitted from the light emitting diode 20 propagates within the light guide 24 to an interface between the front surface 32*a* of the light guide 24 and the optical coating layer 42 at an angle, $\alpha$. In this example, a portion 44*b* of the light 44*a* internally reflects off of the front surface 32*a* and continues to propagate within the light guide 24. Another portion 44*c* of the light 44*a* does not internally reflect and propagates through the optical coating layer 42 at an angle, $\beta$, that is different than the angle alpha (i.e., different because of the difference in the indices of refraction between the light guide 24 and the optical coating layer 42). The portion 44*c* of the light 44*a* propagates toward the outer surface of the optical coating layer 42 and internally reflects back into the light guide 24. Thus, the optical coating layer 42 prevents the portion 44*c* of the light 44*a* from escaping the light guide 24, thereby reducing the light loss of the light guide 24.

The angles $\alpha$ and $\beta$ are determined in a known manner using the equations $n_1 \cdot \sin \alpha = 1$, where $\sin \beta = (n_1/n_2) \cdot \sin \alpha$ and $n_1$ and $n_2$ are the indices of refraction of, respectively, the light guide 24 and the optical coating layer 42.

In the illustrated example, the optical coating layer 42 also reduces reflected ambient light in a direction normal to the optical coating layer 42. This provides the advantage of improved viewing of the instrument display mark 30 with less interference from reflected ambient light. For example, ambient light 54*a* propagates normal to the light guide 24 and optical coating layer 42. A portion 54*b* of the ambient light 54*a* reflects off of the surface of the optical coating layer 42 back toward the front lens 28 (i.e., toward an observer). Another portion 54*c* of the ambient light 54*a* propagates thought the optical coating layer 42 and reflects off of the front surface 32*a* of the light guide 24. In this example, the reflected portions 54*b* and 54*c* are at least partially out of phase and destructively interfere with each other in a known manner, thereby reducing the reflected light.

In one example, the optical coating layer 42 is deposited on the light guide 24 in a desired thickness, d, to maximize the destructive interference and minimize the reflected light for rays normal to the surface. In a further example, optical coating layer 42 has a thickness d according to the equation $d = \lambda/(4n_2)$, where $n_2 = (n_1+1)/2$, $n_1$ is the index of refraction of the light guide 24, $n_2$ is the index of refraction of the optical coating layer 42, and $\lambda$ is the wave length of the ambient light.

Figure 3:
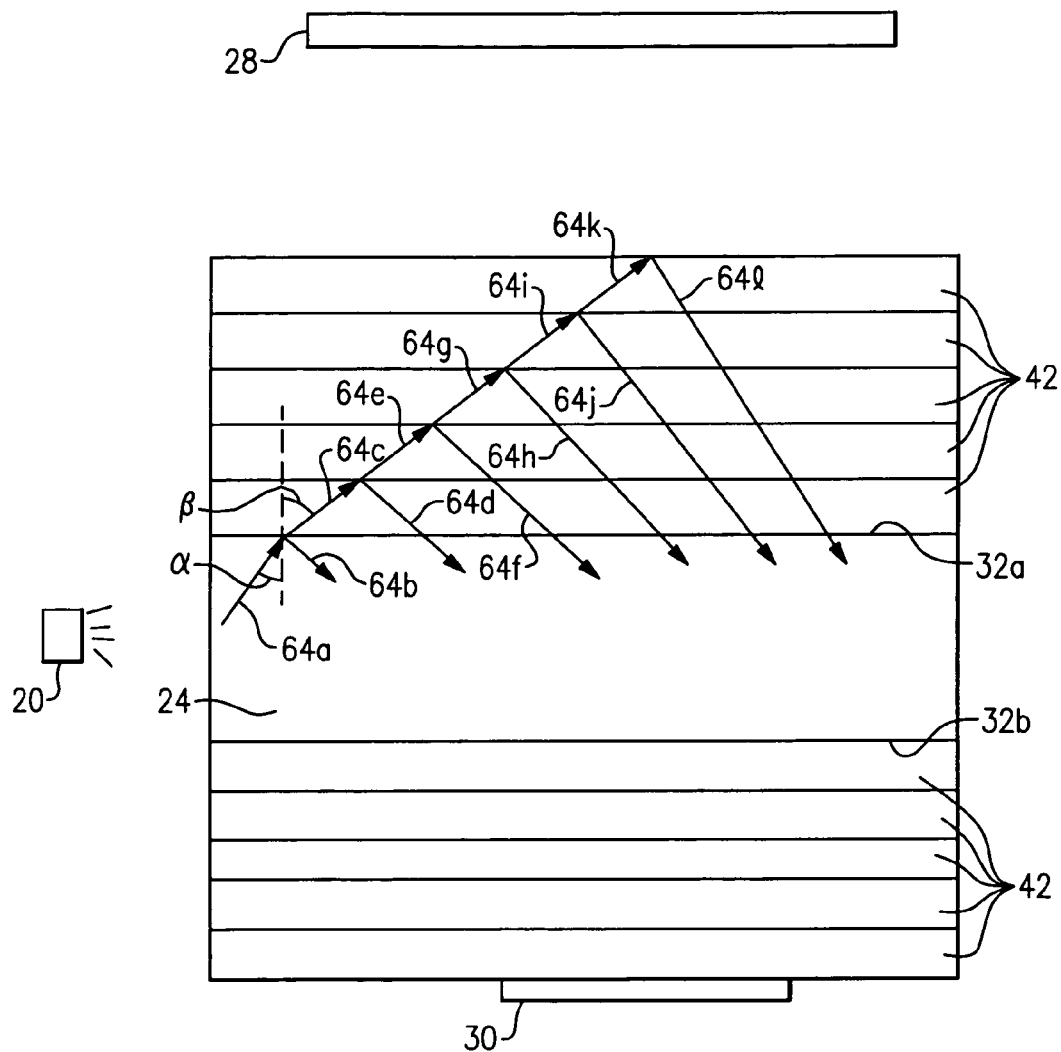
FIG. 3 is a schematic view of an example portion of a light guide and plurality of optical coating layers within the instrument display.

FIG. 3 is a simplified schematic cross-sectional view of another example in which five layers of the optical coating layer 42 are on the light guide 24. The added optical coating layers 42 further reduce the light loss of the light guide 24. Similar to the example shown in FIG. 2, the light emitting diode 20 emits light 64*a* that propagates within the light guide 24 toward an interface between the front surface 32*a* of the light guide 24 and the first of the optical coating layers 42 at an angle, $\alpha$. In this example, a portion 64*b* of the light 64*a* internally reflects off of the front surface 32*a* and continues to propagate within the light guide 24. Another portion 64*c* of the light 64*a* does not internally reflect and propagates through the first of the optical coating layers 42 at an angle, $\beta$, that is different than the angle alpha (i.e., different because of the difference in the indices of refraction between the light guide 24 and the optical coating layer 42). The portion 64*c* of the light 64*a* propagates toward the outer surface of the first of the optical coating layers 42. A portion 64*d* of the light 64*c* internally reflects back into the light guide 24. Another portion 64*e* of the light 64*c* does not internally reflect and propagates through the second of the optical coating layers 42 at the angle $\beta$. A portion 64*f* of the light 64*e* internally reflects back into the light guide 24. Another portion 64*g* of the light 64*e* does not internally reflect and propagates through the third of the optical coating layers 42 at the angle $\beta$. The portion 64*g* of the light 64*c* propagates toward the outer surface of the third of the optical coating layers 42. A portion 64*h* of the light 64*g* internally reflects back into the light guide 24. Another portion 64*i* of the light 64*g* does not internally reflect and propagates through the fourth of the optical coating layers 42 at the angle $\beta$. The portion 64*i* of the light 64*g* propagates toward the outer surface of the fourth of the optical coating layers 42. A portion 64*j* of the light 64*i* internally reflects back into the light guide 24. Another portion 64*k* of the light 64*i* does not internally reflect and propagates through the fifth of the optical coating layers 42 at the angle $\beta$. The portion 64*k* of the light 64*i* propagates toward the outer surface of the fifth of the optical coating layers 42. At least a portion 64*l* of the light 64*k* internally reflects back into the light guide 24. Thus, the optical coating layers 42 prevent the portions 64*d*, 64*f*, 64*h*, 64*i*, and 64*l* from escaping the light guide 24, thereby reducing the light loss of the light guide 24.

The five optical coating layers 42 also reduce reflected ambient light in a direction normal to the optical coating layers 42, as explained regarding the example shown in FIG. 2. In the illustrated example, a greater number of optical coating layers 42 can be used for even further reduction in light loss and reflection.

Figure 4:
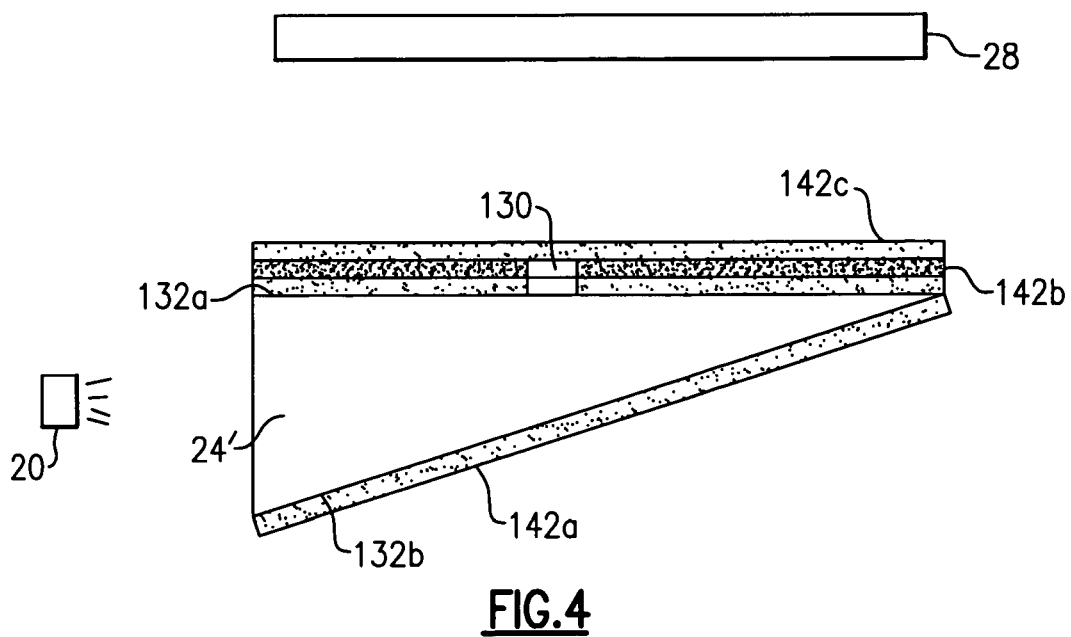
FIG. 4 is a schematic view of an example portion of a light guide and opaque optical coating layers within the instrument display.

FIG. 4 shows a simplified schematic cross-sectional view of another example light guide 24'. In this example, the light guide 24' includes a plurality of opaque optical coating layers 142*a*, 142*b*, and 142*c*. In the illustrated example, the opaque optical coating layer 142*a* is a white paint that is painted directly onto the front surface 132*a* and rear surface 132*b* of the light guide 24'. The opaque optical coating layer 142*b* is a black paint that is painted directly onto the opaque optical coating layer 142*a* on the front surface 132*a* of the light guide 24'. In this example, a display mark 130 is etched into the opaque optical coating layers 142*a* and 142*b* in a known manner. The third opaque optical coating layer 142*c* is a paint of a different color than the white and black paints that is painted directly onto the black paint over the display mark 130. In one example, the paint of the third opaque optical coating layer 142*c* is gray.

The opaque optical coating layers 142*a* and 142*b* (i.e., the white and black paints) function to prevent light from the light emitting diode 20 from escaping the light guide 24' except at the etched display mark 130. The light guide 24' directs the light from the light emitting diode 20 out of the light guide 24' through the etched display mark 130 such that the portion of the third opaque optical coating layer 142*c* under the display mark 130 illuminates and becomes visible to an observer of the instrument display 10. In this manner, the light guide 24' provides the advantage of illuminating the etched display mark 130 without significant light loss, which may interfere with the viewing of marks and reduce the illuminated intensity in prior displays.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An instrument display comprising:
a light source that selectively emits light, wherein the emitted light has a wavelength ($\lambda$);
a light guide receiving the light, wherein the light guide has a first index of refraction ($n_1$); and
at least one anti-reflective optical coating layer on the light guide, wherein the anti-reflective optical coating layer has a second index of refraction ($n_2$) that is greater than the first index of refraction of the light guide for preventing light from leaving the light guide in an undesired direction, and wherein the anti-reflective optical coating layer has a thickness (d) that is bused on the wavelength of the emitted light and the second index of refraction.

2. The display as recited in claim 1, wherein the light guide includes a first surface that faces in a first direction toward an instrument display lens and a second surface that faces in a second direction opposite of the first direction, wherein the at least one anti-reflective optical coating layer is on the first surface.

3. The display as recited in claim 2, wherein the at least one anti-reflective optical coating layer is also on the second surface.

4. The display as recited in claim 3, wherein the at least one anti-reflective optical coating layer comprises multiple anti-reflective optical coating layers, wherein each of the multiple anti-reflective optical coating layers is in direct contact with at least one other of the multiple anti-reflective optical coating layers.

5. The display as recited in claim 4, wherein the multiple anti-reflective optical coating layers are located one over another.

6. The display as recited in claim 3, wherein the at least one optical anti-reflective coating layer comprises at least five anti-reflective optical coating layers located one over another.

7. The display as recited in claim 3, wherein the light guide includes a graphic on the second surface.

8. The display as recited in claim 1, wherein the at least one anti-reflective optical coating layer is transparent or translucent.

9. A method comprising:
depositing at least one anti-reflective optical coating layer on a light guide, wherein the light guide has a first index of refraction ($n_1$) and the at least one anti-reflective optical coating layer has a second index of refraction ($n_2$) that is greater than the first index of refraction of the light guide, and wherein the anti-reflective optical coating layer has a thickness (d) that is based on a wavelength of emitted light ($\lambda$) and the second index of refraction.

10. The method as recited in claim 9, including depositing the at least one anti-reflective optical coating layer on a first surface of the light guide that faces in a direction toward an instrument display lens.

11. The method as recited in claim 10, including depositing the at least one anti-reflective optical coating layer on a second, opposite surface of the light guide that faces in a direction away from the instrument display lens.

12. The method as recited in claim 11, including depositing a first layer of the at least one anti-reflective optical coating layer, and depositing a second layer of the at least one anti-reflective optical coating layer on the first layer.

13. The method as recited in claim 11, including printing a graphic on the second surface.

14. An instrument display comprising:
a light source that selectively emits light;
a light guide receiving the light;
a first opaque optical coating layer directly on the light guide, wherein the first layer comprises a white paint;
a second opaque optical coating layer directly on the first layer, wherein the second layer comprises a black paint; and
a third opaque optical coating layer directly on the second layer, wherein the third layer comprises a paint having a different color than the black paint and the white paint.

15. The display as recited in claim 14, wherein the plurality of opaque optical coating layers includes an etched display mark that extends through two of the plurality of opaque optical coating layers.

16. The display as recited in claim 14, wherein the plurality of opaque optical coating layers are on two opposed surfaces of the light guide.

17. The display as recited in claim 1, wherein the light guide has an index of refraction between 1.5 and 1.6.

18. An instrument display comprising:
a light source that selectively emits light;
a light guide receiving the light, wherein the light guide has a first index of refraction; and
at least one anti-reflective optical coating layer on the light guide, wherein the anti-reflective optical coating layer has a second index of refraction that is greater than the first index of refraction of the light guide for preventing light from leaving the light guide in an undesired direction, and wherein the light guide includes a first surface that faces in a first direction toward an instrument display lens and a second surface that faces in a second direction opposite of the first direction, wherein the at least one anti-reflective optical coating layer is on the first surface, and wherein a plurality of instrument display marks are on the second surface.

19. An instrument display comprising:
a light source that selectively emits light;
a light guide receiving the light, wherein the light guide has a first index of refraction; and
at least one anti-reflective optical coating layer on the light guide, wherein the anti-reflective optical coating layer has a second index of refraction that is greater than the first index of refraction of the light guide for preventing light from leaving the light guide in an undesired direction, and wherein a thickness of the at least one anti-reflective optical coating layer varies for reflecting ambient light normal to the at least one anti-reflective optical coating layer.

20. An instrument display comprising:
a light source that selectively emits light;
a light guide receiving the light, wherein the light guide has a first index of refraction; and
at least one anti-reflective optical coating layer on the light guide, wherein the anti-reflective optical coating layer has a second index of refraction that is greater than the first index of refraction of the light guide for preventing light from leaving the light guide in an undesired direction, and wherein the light guide includes a first surface that faces in a first direction toward an instrument display lens and a second surface that faces in a second direction opposite of the first direction, wherein the at least one anti-reflective optical coating layer is on the first surface, and where the first surface and the second surface intersect at a distal end of the light guide having a constant angle between the first surface and the second surface.

21. The display as recited in claim 1, wherein the thickness (d) is $d=\lambda/(4n_2)$.

22. The display as recited in claim 1, wherein the second index of refraction ($n_2$) is $n_2=(n_1+1)/2$.

23. The method as recited in claim 9, wherein the thickness (d) is determined by the equation $d=\lambda/(4n_2)$.

24. The method as recited in claim 9, wherein the second index of refraction ($n_2$) is determined by the equation $n_2=(n_1+1)/2$.

* * * * *

UNITED STATES PATENT AND TRADEMARK OFFICE
CERTIFICATE OF CORRECTION

| | | |
|---|---|---|
| PATENT NO. | : 7,671,859 B2 | Page 1 of 1 |
| APPLICATION NO. | : 11/434651 | |
| DATED | : March 2, 2010 | |
| INVENTOR(S) | : Birman et al. | |

It is certified that error appears in the above-identified patent and that said Letters Patent is hereby corrected as shown below:

IN THE CLAIMS:

Claim 1, Column 5, line 22: "bused" should read as --based--

Signed and Sealed this

Twelfth Day of October, 2010

David J. Kappos
*Director of the United States Patent and Trademark Office*